United States Patent [19]

Norris et al.

[11] 4,180,293

[45] Dec. 25, 1979

[54] SIMULATED SPOKE WHEEL STRUCTURE

[75] Inventors: Curtis Norris, 502 W. Aurora, Santa Ana, Calif. 92707; Delmer D. Scott, Montecito, Calif.

[73] Assignee: Curtis Norris, Santa Ana, Calif.

[21] Appl. No.: 937,484

[22] Filed: Aug. 28, 1978

[51] Int. Cl.$^2$ ............................................... B60B 1/00
[52] U.S. Cl. ......................................... 301/54; 301/104
[58] Field of Search ............ 301/37 R, 37 SS, 37 SA, 301/53, 54, 58–61, 73–75, 104, 78

[56] References Cited

U.S. PATENT DOCUMENTS

| 2,069,952 | 2/1937 | Hoffman | 301/54 |
| 4,019,782 | 4/1977 | Reppert | 301/58 |

FOREIGN PATENT DOCUMENTS 23699 of 1915 United Kingdom ..................... 301/54

Primary Examiner—H. Grant Skaggs
Attorney, Agent, or Firm—Georges A. Maxwell

[57] ABSTRACT

A two-piece automobile wheel including an annular outer rim with front and rear ends, a cast metal center with an annular radially outwardly opening outer channel portion engaged within and closed by the rim, an intermediate portion extending radially inwardly and axially rearwardly from the outer portion and a central disc-portion; said disc portion has an annular series of circumferentially spaced stud openings and an elongate forwardly projecting tubular cone radially inward of the openings; an annular channel ring is fixed to the disc portion radially outward of the openings; the forward end of the cone has an annular series of apertures accommodating the inner end portions of an annular series of radially outwardly, axially rearwardly and circumferentially inclined front spokes; the ring has an annular series of apertures accommodating the inner end portions of an annular series of radially outwardly, axially forwardly and circumferentially inclined rear spokes; said channel portion has an annular series of apertures accommodating spoke nuts engaged with the outer end portions of the front and rear spokes; series of front spokes are divided into a number of groups of spokes equal to the number of openings and the groups are spaced circumferentially with the inner end portions of the spokes nearest the axis of said openings spaced circumferentially from said openings.

10 Claims, 7 Drawing Figures

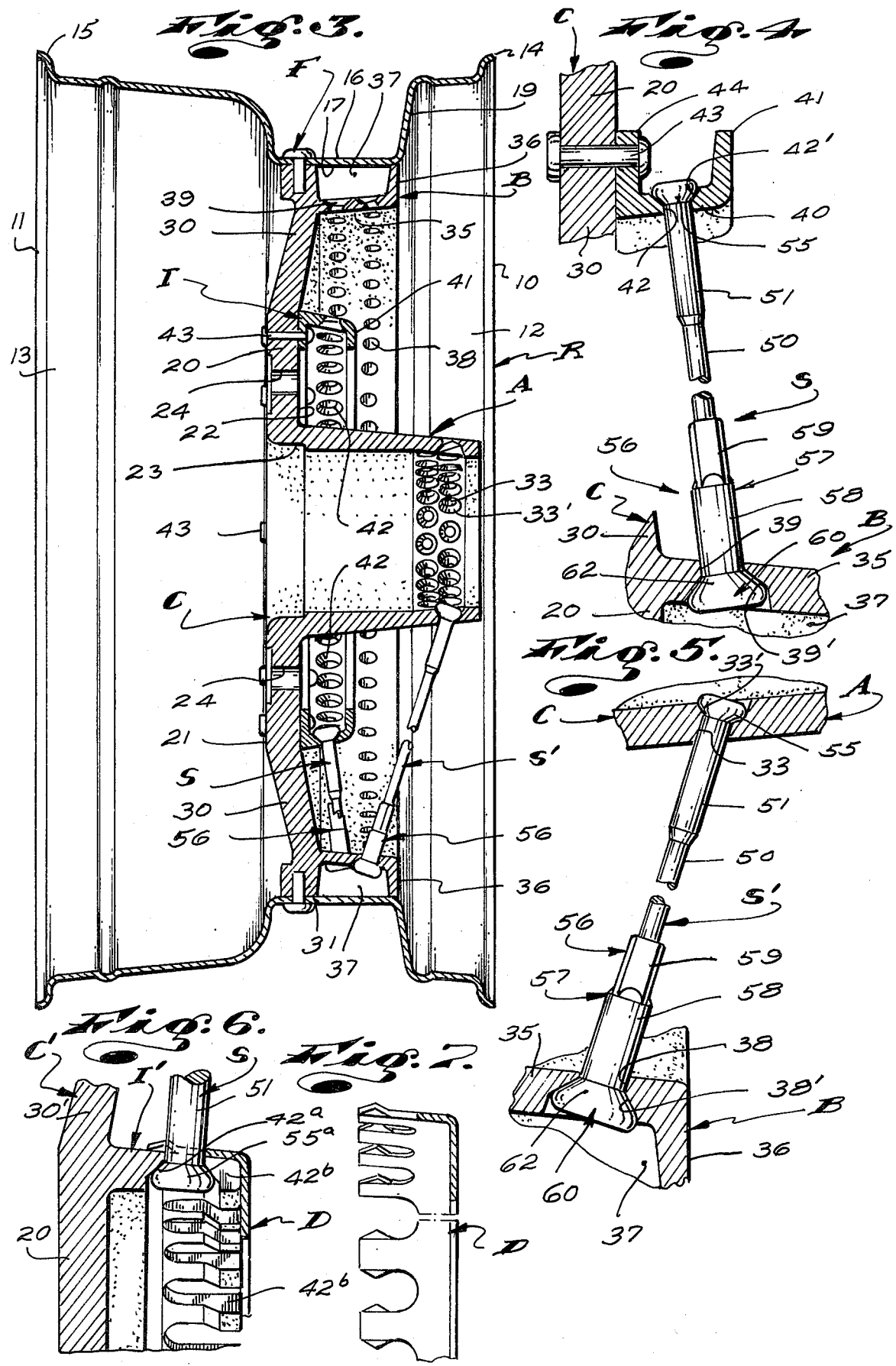

SIMULATED SPOKE WHEEL STRUCTURE

This invention has to do with automobile wheels and is particularly concerned with a novel wheel structure embodying the functional and structural characteristics of disc-type wheels and the structural and aesthetic characteristics of wire spoke type wheels.

In the automotive art, great attention is given to the aesthetic or design aspects of automobile wheels. The type of wheels with which an automobile is equipped is often a status symbol desired by the owner of the automobile.

In the recent past, cast alluminum automobile wheels which are suitable for or simulate light-weight wheels used to equip racing cars have become extremely popular and are widely used by persons who wish to be directly or indirectly identified with those who participate in automobile competitions such as circuit racing and drag racing.

Recent activity in the cast alluminum wheel art has resulted in the establishment of two basic types of wheels, there being one piece wheels where the whole of the wheels are cast as a unit and two part wheels where the outer or peripheral rim portions of the wheel are formed of steel and the central portions of the wheels are cast of metal and are arranged and suitably fixed within the rim portions.

The last noted two piece wheel structures are considered by many to be most desirable since their outer steel rim portions afford the durability and strength of steel where it is most desired and their inner cast centers afford a desired reduction in weight and can be effectively cast or molded to impart desired design characteristics.

While wheels of the general character referred to above have been favorably received by one class of automobile owners, there is a large, more conservative class of automobile owners that believe that those who equip their automobiles with such wheels, demonstrate poor taste. A large number of these same people, on the other hand, want to embellish their cars with special wheels to demonstrate what they consider to be their superior taste and affluence.

To the above end, wire spoke automobile wheels, which are the most costly to make and maintain type of automobile wheel, have become extremely popular and are being produced and are sold as status symbols to automobile owners who wish to be identified with a more affluent and conservative segment of our society.

The principal disadvantages and shortcomings of wire wheels is that a set of four such wheels costs in excess of $1,000 and the spokes of such wheels are subject to stretching and rendering the wheels weak and unsafe, thereby requiring frequent and costly servicing. It is not infrequent that the spokes of such wheels will stretch excessively and require service or the tightening of spokes after 1,000 to 2,000 miles of service. The average down time of an automobile for such servicing of wire wheels is two to three days and the cost for servicing such wheels is from $45.00 to $50.00 per wheel.

In spite of the above noted shortcomings found in wire wheels, the demand for such wheels cannot be presently met by the manufacturers of such wheels.

In efforts to meet the demand for wire wheels, the manufacturers of cast metal wheels have sought to embellish the centers of such wheels with simulated wire spoke patterns by providing the centers of the wheels with appropriately shaped and arranged apertures. The manufacturers of hub caps and sheet metal wheel accessories have provided deeply dished concave hub cap structures with simulated wire spokes mounted therein, for engagement in and with conventional steel automobile wheels in efforts to make conventional wheels appear similar to wire wheels. The cast metal wheel centers with simulated wire spoke patterns do not closely simulate real wire wheels and the simulated wire spoke hub caps provided by the prior art are obvious, decorative wheel accessories and are considered by many to be cheap tinsel-like accessories.

An object of our invention is to provide a wheel structure of the general character referred to which is a combination wire spoke and disc-type wheel wherein the wire spoke structure of the wheel is disposed and normally visible at the axially outwardly disposed front end of the wheel and the disc-type wheel center structure is axially rearward of the spoke structure where it is substantially obscured from view from the front end of the wheel.

It is another object of our invention to provide a novel wheel structure which incorporates the structural and manufacturing advantages afforded by two piece wheel structures including formed steel rims and cast metal centers and which includes novel wire spoke mounting means with wire spokes related thereto to impart the wheel structure with the appearance of a wire spoke wheel.

It is an object and feature of the present invention to provide a wheel structure of the general character referred to wherein the wire spokes employed are structurally the same as wire spokes employed in establishing wire wheels (as distinguished from simulated or imitation spokes) and wherein wire spoke mounting means cooperatively engage and support the spokes in a manner which is substantially visibly indistinguishable from the manner in which the spokes of wire wheels are supported, whereby the wheel structure is so similar in appearance to a wire wheel structure that those familiar with the construction and appearance of wire wheels are likely to be confused as to the true nature of the wheel.

Another object and feature of the present invention is to provide a novel wheel of the general character referred to above which includes easy and economical to make and assemble parts; a wheel which is strong, curable and easy to maintain; and a wheel which can be produced and sold for a small fraction of the price exacted for wire wheels having the same general appearance.

The foregoing and other objects and features of our invention will be fully understood and will become apparent from the following detailed description of typical preferred forms and applications of our invention throughout which description reference is made to the accompanying drawings.

DESCRIPTION OF THE DRAWINGS

FIG. 3 is a transverse sectional view taken substantially as indicated by line 3—3 on FIG. 1;

FIG. 4 is an enlarged detailed sectional view of a portion of a structure shown on FIG. 3;

FIG. 5 is an enlarged detailed sectional view of another portion of the structure shown on FIG. 3;

FIG. 6 is a sectional view of another form of spoke mounting means that we provide; and FIG. 7 is a view of a part of the structure shown on FIG. 6.

DETAILED DESCRIPTION OF THE INVENTION

Figure 1:
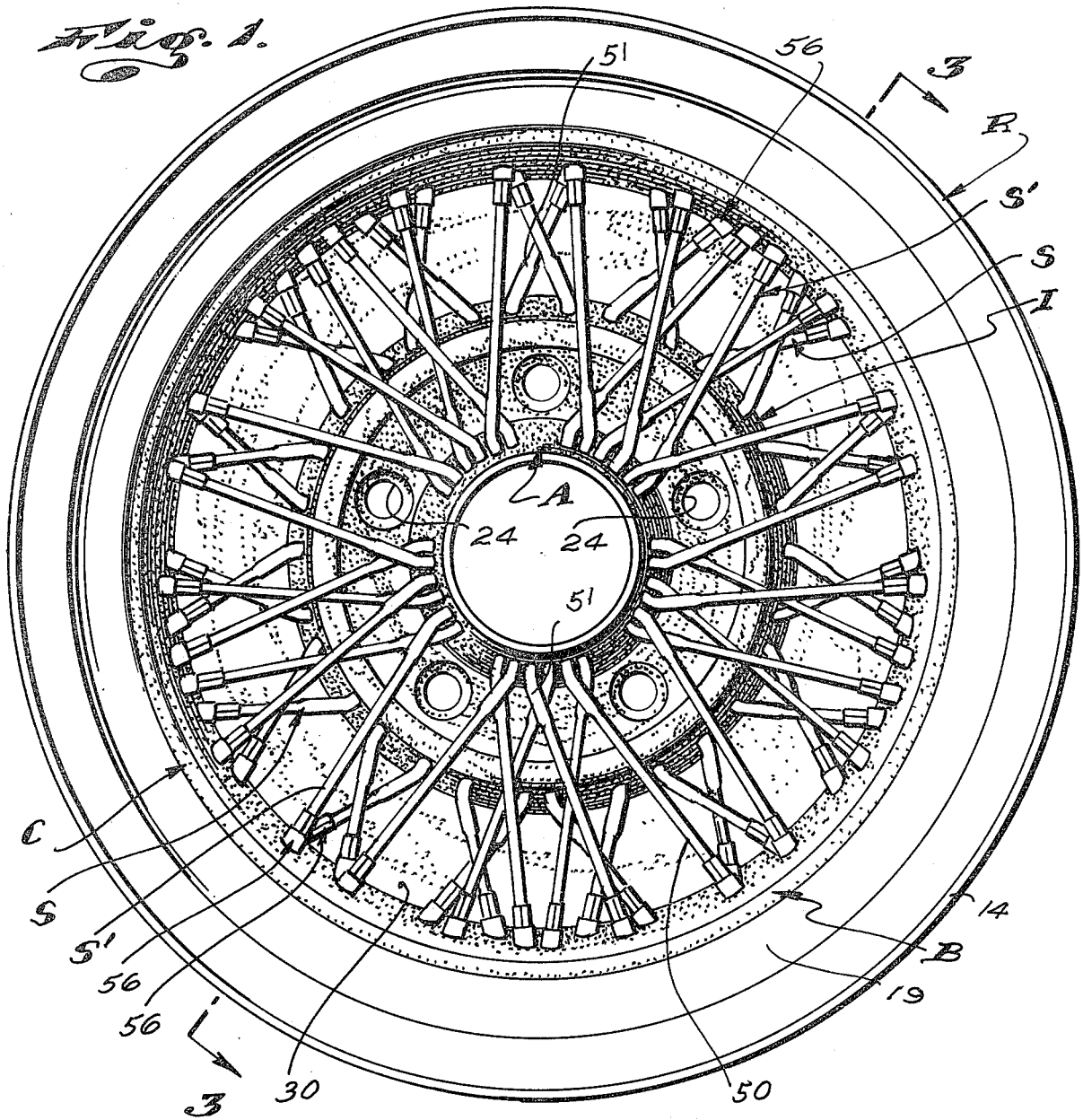
FIG. 1 is a front end elevational view of our new wheel.

Referring to the drawings, the automobile wheel W that we provide is a two piece wheel structure including an outer, elongate, annular rim R and a center C.

The rim R is preferably formed of sheet steel and is adapted to be engaged within and to carry a pneumatic automobile tire (not shown). The rim is of substantial axial extent and has front and rear ends 10 and 11. The rim R, in accordance with common practice, has substantially axially extending cylindrical tire bead-engaging front and rear end portions 12 and 13 and substantially radially outwardly projecting tire bead-retaining flanges 15 and 16 about the axially outer ends of the portions 12 and 13. In addition, the rim has a radially inwardly offset central portion 16 of desired axial extent and which defines an elongate cylindrical radially inwardly disposed wheel center engaging surface 17. The central portion 16 of the wheel is spaced axially between front and rear ends of the rim so that the wheel center C, when related to the rim R, is spaced axially rearward or is axially offset from the front end of the rim a predetermined distance.

The rim R illustrated and briefly described above is a standard automobile wheel rim such as is commonly used in most automobile wheel structures having steel rims and can vary in details within that range of differences which exist in automobile wheel rims that are presently produced and used in the establishment of automobile wheels.

The wheel center C is, fundamentally, a substantially flat, radially extending, unitary disc-like part cast or molded of suitable metal, such as an alluminum alloy.

The center C has a central mounting portion or disc 20 with substantially flat radially extending axially forwardly and rearwardly disposed surface 20 and 22. The disc 20 has a central axle or dust-cap receiving aperture 23 and an annular series of wheel mounting stud receiving openings 24 in circumferential and radial outward spaced relationship about the aperture 23.

The disc 20 is adapted to be arranged adjacent the axially outwardly or forwardly disposed surface of a wheel mounting pad or break drum (not shown) of a related automobile wheel, with its rear surface 22 seated on that pad or break drum surface and with wheel mounting studs (not shown) on the pad or break drum projecting through and forwardly from the openings 24. The wheel is secured to the pad or break drum by nuts (not shown) engaged on the studs and with the front surface 21 of the disc 20.

In the event that the wheel mounting pad of break drum has an axially outwardly or forwardly projecting hub-like bearing housing and/or dust-cap, the hub-like projection and/or dust-cap are freely accommodated by the central aperture 23.

The disc 20 of the wheel center C, to the extent that we have described it in the foregoing, is the same as the central mounting disc of most cast metal wheels provided by the prior art.

In the case illustrated, the disc 20 has five stud-receiving openings 24, which is the most common number of studs provided on the wheel mounting pads and/or break drums of domestic automobiles. In practice, the number of openings 24 can be reduced to four which is the next most common number of wheel mounting studs provided to mount the wheels on domestic automobiles.

The wheel center C next includes an outer portion 30, continuing or extending substantially radially outward from the disc 20. The outer portion 30 has an annular radially outwardly disposed cylindrical edge or surface 31 which corresponds in diametric extent with and is arranged in tight engagement with the wheel center engaging surface 17 of the rim R, as shown in FIG. 3 of the drawings. The fit between the rim R and the center C is preferably a press fit.

The center C is fixed in and with the rim by fastening means F. The fastening means F can comprise circumferentially spaced radially extending rivets or screw-like fasteners 32 engaged through the portion 16 of the rim and into the center C, as illustrated in FIG. 3 of the drawings. Alternatively, the center C can be fixed in and with the rim R by any one of the several other forms of fastening means commonly employed by the prior art to fixed cast metal wheel centers in related steel wheel rims. For example, the means F can be that form of fastening means which comprises ferrous metal mounting straps implanted in the wheel center C when the wheel center is cast and having portions projecting outwardly from the center and welded to the rim R.

The outer portion 30 of the wheel center C, its relationship with the rim R and the means F, provided to fix the center and rim together, described in the foregoing, is essentially the same as in most two piece wheels provided by the prior art.

In the instant invention, to the best of our knowledge and belief, the wheel center C distinguishes from all cast metal wheel centers provided by the prior art by including a central, elongate, tubular cone A formed integrally with and projecting forwardly from the disc. The rear end of the cone A is concentric with and communicates with the aperture 23 in the disc. The cone A projects freely forwardly from the dsic and terminates near to the radial plane of the front end 10 of the rim R. The cone has an open front end 32. The front end portion of the cone is provided with an annular series of axially and circumferentially spaced, substantially radially extending spoke receiving openings 33.

The diameter of the cone A is substantially the same as the diameter of the hubs of certain popular wire spoke wheel structures and the axial placement of the openings 33, relative to the front end of the rim R is substantially the same as the axial placement of similar spoke receiving openings in wire wheel hubs.

The wheel center C is further distinguishable from prior art cast wheel centers by the inclusion or addition of an annular radially outwardly opening outer channel portion B formed integrally on the front side of and projecting axially forward from the outer portion 30 of the center C. The channel portion B has a cylindrical axially extending inner wall 35 spaced radially inward of the outer edge 31 of the portion 30 and an annular front wall 36 extending radially outward from the forward end of the wall 35. The outer portion of the portion 30, the inner wall 35 and the wall 36 cooperate to define a radially outwardly opening annular channel 37 about the perimeter of the center C.

The axial extent of the outer peripheral portion of the center C, between the rear of the outer portion 30 and the front wall 36 of the portion B is substantially equal to the axial extent of the central portion 16 and inner surface 17 of the rim R. When the wheel center C is engaged and fixed within the rim R, the channel 37 is surrounded and closed by the central portion 16 of the rim R.

In practice, the front wall 36 of the channel portion B is preferably in or close to being in a common plane with a forward radially outwardly extending intermediate wall 19 of the rim R which extends between the portions 12 and 16 of the rim, as clearly shown in FIG. 3 of the drawings. With such a relationship of parts, the walls 36 and 19 fare or join each other to appear as one wall.

It is to be noted that the radial extent of the wall 36 and of the channel 37 can be reduced to a great extent and are shown as being greater in radial extent than need be, for the purpose of illustration. The inner wall 35 of the channel portion B is provided with front and rear axially spaced annular series or rows of circumferentially spaced spoke receiving openings 38 and 39.

Finally, the wheel center C distinguishes from wheel centers provided by the prior art by the addition or inclusion of a spoke mounting ring I on and projecting forwardly from the front surface 21 of the disc 20. The ring I is a radially inwardly opening U-shaped channel-like ring and is spaced radially outward of the stud openings 24 and radially inward and axially rearward of the outer channel portion B. The ring I occurs in radial spaced relationship from and about the rear end portion of the cone A.

The ring I has a substantially cylindrical axially extending outer wall 40 projecting axially forward from the disc 20 and a radially inwardly projecting annular front wall 41 at and about the forward end of the wall 40. The wall 40 has an annular series or row of radially extending circumferentially spaced spoke receiving openings 42.

In the form of the invention shown in FIG. 3 of the drawings, the ring is a separate cast metal part and is fastened to the disc 20 by means of rivets 43 or the like engaged through the disc 20 and a radially inwardly projecting mounting flange or rear wall 44 at the rear end of the wall 40, as shown in FIG. 4 of the drawings.

The wheel that we provide next includes an annular series of rear spokes S and an annular series of front spokes S'. The spokes S and S' are real or genuine spokes such as are used in wire spoke wheels for automobiles and are to be distinguished both structurally and aesthetically from simple lengths of metal rod or wire such as the prior art has sought to utilize in establishing simulated or imitation wire spoke wheels.

Figure 2:
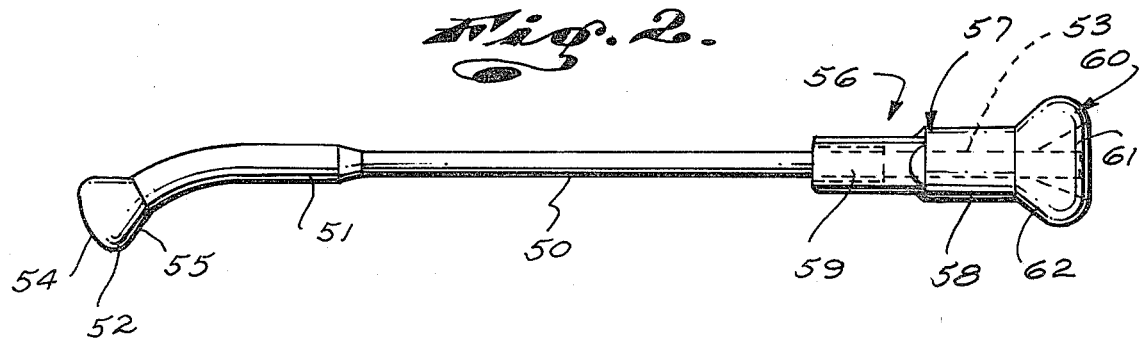
FIG. 2 is an enlarged detailed view of a spoke used in our wheel.

Referring to FIG. 2 of the drawings, each spoke structure includes an elongate cylindrical shaft 50 with substantially disposed radial inner and outer ends, an elongate cylindrical neck at the inner end of the shaft and an enlarged head 52 at the outer free end of the neck. The neck is slightly larger in diameter than the shaft. The inner portion 53 of the shaft 50 is threaded. The neck and head are formed on the shaft by a suitable cold heading operation. The head has a semi-spherical outer end 54 and a radially and axially inwardly convergent conical seat engaging stop surface 55.

The large diameter neck 53 is of limited longitudinal extent and is bent at a predetermined location intermediate its ends whereby its inner and outer portions are axially misaligned at an angle complimentary with the angle at which the axis of the shaft 50 is to be offset or circumferentially inclined relative to that radial plane of the wheel that intersects the point of joinder between the spoke and the wheel center.

The spoke structure next and finally includes a spoke nut 56 threaded on and about the outer end portion of the shank. The nut 56 has an elongate sleeve 57 with a cylindrical outer portion 58 and a polygonal tool or spoke wrench engaging inner portion 59 and an enlarged head 60 at the outer end of the sleeve. The head 60 has a substantially spherical outer portion 61 and a radially and axially inwardly convergent conical seat engaging stop surface 62.

The sleeve 57 and head 60 of the nut 56 are substantially greater in diametric extent or are larger than the neck 51 and head 52 of the spoke.

The rear spokes S extend between the ring I and the channel portion B of the wheel and are shorter than the front spokes S' that extend between the cone A and the channel portion B of the wheel.

The short rear spokes S are arranged in circumferential spaced pairs. The pairs of spokes S are spaced an equal distance apart circumferentially of the wheel with adjacent pairs of spokes in non-crossing or interfering relationship with each other. The two spokes of each pair of spokes S are arranged in crossed relationship with each other. The spokes S of each pair of spokes are angularly related to the mean radial plane of the pair of spokes at equal and opposite angles.

The pattern of spokes S is substantially uniform and symmetrical and the number of pairs of spokes S can be varied as desired, since the spokes S are arranged in the wheel structure adjacent the outer portion 30 of the center C where they are in non-interfering relationship with any other structure of the wheel.

The spokes S are first engaged through related openings 42 in the ring I, before that ring is arranged adjacent and fixed to the wheel center. The spokes S are engaged through the openings 42 by entering their outer ends into said openings from the inner side of the ring and are advanced radially outwardly through the openings until their curved necks 51 extend through and from said openings and the stop surfaces 55 of the head 52 enter and seat in counter sinks 42' at the inner ends of the openings 42.

After the spokes S are loosely related with the ring I in the manner set forth above, that sub-assembly is related to the wheel center C (before the center C is related to the wheel rim R) with the ring I adjacent to the front surface 21 of the disc.

With the sub-assembly thus related to the wheel center C, the spokes S are manually rotated and shifted axially to align their outer ends with their related openings 39 in the channel portion B of the wheel center. Upon aligning the spokes S' with the openings 39', the spokes are shifted axially outwardly into the openings 39. As the spokes S are engaged in the openings 39, the spoke nuts 56 are engaged through the openings 39 from the outer side of the portion B and are threadedly advanced into engagement with the end portions 53 of the spokes. When all of the spokes S are thus engaged with the channel B, the ring I is fixed to the wheel center or disc C and the nuts 56 are advanced on the spokes, with their sleeves projecting through and inwardly from the openings 39, until the stop surfaces on the heads thereof establish tight seated engagement in counter sinks 70 at the outer ends of the openings and the spokes are suitably tensioned between the ring I and channel B.

In practice, the longitudinal axis of the openings 39 and counter sinks 70 are established in the portion B so that they are substantially aligned with their related spoke shafts 50 when the structure is assembled.

After the spokes are installed as noted above, the front spokes S' are next manually engaged and/or installed in the wheel. To install the spokes S', the outer end portions of the spokes S' are angularly related to the open front end of and are moved rearwardly and laterally into the forward portion of the cone A. The inner ends of the spokes are then entered and advanced radially outwardly through and from related spoke openings 33 in the cone A. The spokes S' are thereafter rotated and moved axially outwardly into alignment with related forward spoke openings 38 in the channel portion B of the center C and their outer end portions are advanced into the openings 38.

Thereafter, the nuts 56 for the spokes S' are engaged on and with the outer end portions of the spokes and are advanced thereon so that the sleeve portions of the nuts extend through and from the openings 38. Thereafter, the nuts 56 are tightened so as to suitably tension the spokes S' between the cone and the portion B and so the stop surfaces 55 and 62 of the heads 52 and 60 establish tight seated engagement in counter sinks 33' and 38'.

The spokes S' occur in a radial plane spaced axially forward of and which overlies the front of the stud openings 24 in the disc 20 of the wheel center. Accordingly, the spokes S' must be specially arranged so as not to extend across the forward ends of the openings 24 and thereby obstruct free access thereto. To the above end, the spokes S' are arranged in a number of circumferentially spaced groups equal to the number of stud openings 24 and the groups of spokes are arranged circumferentially so that each group of spokes occur between a related pair of adjacent openings 24, with sufficient clearances circumferentially of said openings to afford free access thereto, from the front end of the wheel.

In our preferred form of the invention and as clearly shown in FIG. 1 of the drawings, the front spokes S' are divided into five groups and the groups are circumferentially spaced and arranged so that they occur in circumferential spaced relationship between the five openings 24 and thereby provide free access to said openings.

Each group of front spokes includes six spokes S'. The inner ends of the spokes of each group of spokes occur in close spaced relationship circumferentially of and about the cone A. The end spokes, at the opposite ends of each circumferentially spaced group of spokes, converge radially outwardly toward the central or mean radial plane of the group of spokes and join the channel portion B of the wheel center in close circumferential spaced relationship with each other.

The second spokes, adjacent the first spokes, diverge relative to each other as they extend out from the cone A so that their inner end portions cross the inner end portions of their adjacent first spokes and so that their outer ends join the channel B in close proximity to the radial plane on which their adjacent or related openings 24 of the wheel occurs.

The third or two central spokes S' of each group of front spokes converge outwardly as they extend outwardly from the cone A so that their inner end portions cross each other. The third or central spokes therefor diverge relative to each other so that their central portions cross the central portions of related first spokes and their outer ends join the channel B in circumferential spaced relationship between the outer ends of their related first and second spokes.

With the special and unique spoke arrangement of spokes S' illustrated in the drawings and set forth above, it will be apparent that a complicated, busy, uniform pattern of front spokes is provided. The pattern of front spokes S' would be an effective front spoke pattern in a wire spoke wheel and is similar in appearance to spoke patterns employed in genuine wire spoke wheels.

The patterns of front and rear spokes S' and S cooperate to establish an overall spoke pattern which, upon casual viewing is indistinguishable from patterns of spokes utilized in the establishment of wire spoke wheel structures.

After the spokes S and S' are related or installed in and with the wheel center C in the manner set forth above, the wheel center is engaged within and is fixed to the rim R, completing the wheel structure W.

In the completed wheel, the channel 37 in the channel portion B of the wheel center is covered or closed by the central portion 16 of the rim and the heads of the spoke nuts are obscured.

The front wall 41 of the ring I effectively obscures the heads 52 of the spokes from view.

In practice, the open front end of the central cone A on the wheel center is closed and covered by a decorative cap (not shown) which obscures the heads 52 of the spokes S' from view.

In the form of our invention shown in FIGS. 6 and 7 of the drawings, the ring I' is integrally formed on the wheel center. A radially inwardly opening channel is machined therein and is formed to establish inclined seats $42^a$ for the heads 52 of the spokes S. The ring I' is provided with radially and axially opening circumferentially spaced spoke receiving notches $42^b$.

With the ring I' set forth above, it will be apparent that the spokes S can be installed in and with the wheel center by first engaging their outer ends through their related openings in the channel portion of the wheel center and thereafter advancing the inner end portions of those spokes into their related notches $42^b$ and the heads thereof into seated engagement with the seat $42^1$. With the spokes thus engaged in the openings in the channel portion B and in and with the ring I', the nuts for the spokes can be easily and conveniently engaged with the spokes and advanced to tighten and set the spokes between the ring I' and the channel portion B.

It will be apparent that with the above modified form of our invention, the time and cost of installation of the spokes S can be materially reduced.

In this second or modified form of our invention, a decorative sheet metal ring D can be provided to engage over the front and about the exterior of the ring I' to obscure the notches in the ring and the heads of the spokes.

The outer cylindrical portion of the ring D can, as shown in FIGS. 6 and 7 of the drawings, be suitably notched to accommodate the spokes. The notches can be provided with resilient spoke engaging retaining projections to releasably retain the ring D in position.

It will be apparent that in practice, the front end of the cone A can be provided with spoke receiving notches similar to the spoke receiving notches in the ring I', instead of the openings 33 provided therein, without departing from the spirit of our invention.

Having described only typical preferred forms of our invention, we do not wish to be limited to the specific details herein set forth, but wish to reserve to ourselves any modifications and/or variations that may appear to those skilled in the art and which fall within the scope of the following claims:

Having described our invention, we claim:

1. An automobile wheel including an elongate outer annular tire engaging rim with front and rear ends and an axially extending annular, radially inwardly disposed wheel center mounting surface intermediate its ends, a cast metal wheel center with a flat, radially extending central disc with front and rear surfaces and an annular radially extending outer portion, said disc has a central axially extending dust-cap receiving aperture, a plurality of axially extending mounting stud openings in radial and circumferential spaced relationship about the aperture and a forwardly projecting tubular cone radially inward of the stud openings and communicating with the aperture; said cone has an open front end and an annular series of radially extending front spoke openings spaced axially forward of said disc, said outer portion has a forwardly projecting outwardly opening channel portion with an axially extending inner wall and a radially extending front wall about the perimeter of said outer portion inward of and opposing said wheel center mounting surface; said inner wall has annular series of radially extending front and rear spoke openings; an annular spoke mounting ring with an annular series of radially extending rear spoke openings is on and projects forwardly from the wheel center in radial spaced relationship between the stud openings and the channel portion and spaced axially rearward of said channel portion and the forward portion of said cone, an annular rear series of circumferentially spaced and circumferentially inclined rear spokes extending between the ring and the channel portion with inner and outer ends extending through the rear spoke openings and an annular front series of circumferentially spaced radially and circumferentially inclined front spokes extends between the cone and the channel portion with inner and outer ends extending through the front spoke openings.

2. The wheel set forth in claim 1 wherein said front spokes are spaced circumferentially and inclined circumferentially and axially whereby their inner end portions occur forward of the stud openings in circumferential spaced relationship from the central axes of said stud openings.

3. The wheel set forth in claim 2 wherein half of the spokes of the front series and rear series of spokes are inclined circumferentially in a clockwise direction and the other half of said spokes are inclined circumferentially in a counter-clockwise direction whereby spokes of the front series of spokes are in crossed relationship with each other and spokes of the rear series of spokes are in crossed relationship with each other.

4. The wheel set forth in claim 3 wherein said front spokes are spaced circumferentially and inclined circumferentially and axially whereby their inner end portions occur forward of the stud openings in circumferential spaced relationship from the central axes of said stud openings.

5. The wheel set forth in claim 1 wherein the spokes have straight elongate cylindrical shafts, elongate curved cylindrical necks at the inner ends of the shafts and extending through the spoke openings in the cone and in the ring and enlarged heads at the inner ends of the necks engaging and stopped on the cone and ring at the inner ends of their related spoke openings; the shafts of said spokes have threaded outer end portions extending freely into related spoke openings in the channel portion and carry spoke nuts having elongate sleeves extending through the said openings in the channel member and enlarged heads engaging and stopped on the channel member at the outer ends of the spoke openings therein.

6. The wheel set forth in claim 5 wherein said front spokes are spaced circumferentially and inclined circumferentially and axially whereby their inner end portions occur forward of the stud openings in circumferential spaced relationship from the central axes of said stud openings.

7. The wheel set forth in claim 6 wherein half of the spokes of the front series and rear series of spokes are inclined circumferentially in a clockwise direction and the other half of said spokes are inclined circumferentially in a counter-clockwise direction whereby spokes of the front series of spokes are in crossed relationship with each other and spokes of the rear series of spokes are in crossed relationship with each other.

8. The wheel set forth in claim 5 wherein half of the spokes of the front series and rear series of spokes are inclined circumferentially in a clockwise direction and the other half of said spokes are inclined circumferentially in a counter-clockwise direction whereby spokes of the front series of spokes are in crossed relationship with each other and spokes of the rear series of spokes are in crossed relationship with each other.

9. The wheel set forth in claim 1 wherein said ring is an annular radially inwardly opening channel part with an axially extending outer cylindrical wall and radially extending front and rear walls; said rear wall is arranged adjacent and is fixed to the front surface of the disc radially outward of the stud openings; said rear spoke openings are in the outer wall.

10. The wheel set forth in claim 1 wherein said ring is an annular, elongate, axially extending part formed integrally with and projecting forwardly from the front surface of said disc and said rear spoke openings in the ring are radially and axially forwardly opening notch-like openings; said wheel includes an annular decorative cover part with a radially extending annular front wall overlying the front of and projecting radially inwardly from the ring and obscuring the spoke openings and the inner ends of the rear spokes and an annular outer wall extending rearwardly from the annular front wall and surrounding said ring; said annular outer wall has radially and rearwardly opening notches to accommodate the inner end portions of the rear spokes.

* * * * *